(12) United States Patent
Rosenthal

(10) Patent No.: US 10,697,572 B2
(45) Date of Patent: Jun. 30, 2020

(54) PRESS-IN CONNECTING PIECE FOR PIPE CONNECTION AND TOOL FOR A PRESS-IN CONNECTING PIECE

(71) Applicant: Viega Technology GmbH & Co. KG, Attendorn (DE)

(72) Inventor: Jörg Rosenthal, Reichshof-Eckenhagen (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 660 days.

(21) Appl. No.: 14/766,001

(22) PCT Filed: Jan. 29, 2014

(86) PCT No.: PCT/EP2014/051673
§ 371 (c)(1),
(2) Date: Aug. 5, 2015

(87) PCT Pub. No.: WO2014/122051
PCT Pub. Date: Aug. 14, 2014

(65) Prior Publication Data
US 2015/0377400 A1     Dec. 31, 2015

(30) Foreign Application Priority Data
Feb. 5, 2013   (DE) .................. 10 2013 101 109

(51) Int. Cl.
| F16L 41/08 | (2006.01) |
| F16L 41/06 | (2006.01) |
| F16L 41/12 | (2006.01) |
| B21J 15/04 | (2006.01) |
| B21J 15/10 | (2006.01) |

(52) U.S. Cl.
CPC ......... F16L 41/088 (2013.01); B21J 15/043 (2013.01); B21J 15/105 (2013.01); F16L 41/06 (2013.01); F16L 41/082 (2013.01); F16L 41/12 (2013.01)

(58) Field of Classification Search
CPC ....... F16L 41/088; F16L 41/06; F16L 41/082; F16L 41/12
USPC .................. 285/39, 201–204, 382, 382.5
See application file for complete search history.

(56) References Cited

U.S. PATENT DOCUMENTS

| 1,124,504 | A |   | 1/1915  | Mueller |   |
|-----------|---|---|---------|---------|---|
| 2,195,029 | A | * | 3/1940  | Hathorn | F16B 19/1045 29/511 |
| 2,432,949 | A |   | 12/1947 | Thorngren |   |
| 3,423,986 | A | * | 1/1969  | Young   | B21J 15/043 29/243.526 |

(Continued)

FOREIGN PATENT DOCUMENTS

| CN | 1436949 A   | 8/2003 |
| CN | 201066011 Y | 5/2008 |

(Continued)

Primary Examiner — Anna M Momper
Assistant Examiner — Fannie C Kee
(74) Attorney, Agent, or Firm — The Webb Law Firm

(57) ABSTRACT

A press-in connecting piece for connecting a branch pipe to a pipe in the region of a branch opening. The connecting piece includes a pipe adapter having an inner opening, and a press-in nozzle having a pipe socket, wherein the pipe adapter has a sealing surface for resting in a sealing manner on the outer wall of the pipe, wherein the pipe socket has a tapering end portion remote from the pipe adapter.

12 Claims, 12 Drawing Sheets

(56) References Cited

U.S. PATENT DOCUMENTS

| | | | |
|---|---|---|---|
| 3,616,673 A | | 11/1971 | Miklos |
| 3,942,240 A | | 3/1976 | Gebelius |
| 3,984,132 A | | 10/1976 | Sarson |
| 4,308,736 A | | 1/1982 | Lowe et al. |
| 4,411,458 A | | 10/1983 | Strunk et al. |
| 4,929,001 A | * | 5/1990 | Phillips, II ................ F16L 5/12 285/141.1 |
| 5,074,026 A | * | 12/1991 | MacGregor ......... B25B 27/0007 285/205 |
| 5,088,194 A | | 2/1992 | Lasko |
| 5,103,548 A | | 4/1992 | Reid et al. |
| 5,248,231 A | * | 9/1993 | Denham ............. F16B 19/1054 411/38 |
| 7,374,157 B2 | * | 5/2008 | Wakamori ............. B21D 39/00 267/179 |
| 2006/0103132 A1 | | 5/2006 | Hardin et al. |
| 2008/0238088 A1 | * | 10/2008 | Webb ...................... B25B 27/10 285/39 |

FOREIGN PATENT DOCUMENTS

| | | |
|---|---|---|
| DE | 29622536 U1 | 6/1997 |
| DE | 10257818 A1 | 6/2003 |
| EP | 0339156 A2 | 11/1989 |
| GB | 236308 A | 7/1925 |
| GB | 378617 A | 8/1932 |
| GB | 501347 A | 2/1939 |
| JP | 58100936 A | 6/1983 |

\* cited by examiner

PRESS-IN CONNECTING PIECE FOR PIPE CONNECTION AND TOOL FOR A PRESS-IN CONNECTING PIECE

CROSS-REFERENCE TO RELATED APPLICATIONS

This application is the United States national phase of International Application No. PCT/EP2014/051673 filed Jan. 29, 2014, and claims priority to German Patent Application No. 10 2013 101 109.8 filed Feb. 5, 2013, the disclosures of which are hereby incorporated in their entirety by reference.

BACKGROUND OF THE INVENTION

Field of the Invention

The invention relates to a press-in connecting piece for connecting a branch pipe to a pipe in the region of a branch opening and relates to a tool therefor. The invention also relates to a system consisting of a press-in connecting piece and a tool, as well as to a setting tool for fastening a press-in connecting piece.

Description of Related Art

In domestic installation, when water pipes are laid for heating water or drinking water or when gas pipes are laid, branch pipes are constantly required, for example to realise a pipe distributor.

Hitherto, branch pipes of the previously mentioned type have been introduced into thick-walled pipes, in particular steel pipes by means of connecting pieces, in particular weld-on connecting pieces. However, manual welding on site is time consuming, requires specialist staff, equipment and safety precautions as well as heat protection measures.

It is also known to set connecting pieces for branch pipes using clamps. However, here again the material usage of the clamp is relatively high because the entire pipe has to be encompassed and the clamp has to be suitably rigid due to unfavourable lever ratios.

In the case of an explosive clamp, space must also be provided for a propellant together with a cutting edge and cutting edge runout, and explosion safety must be ensured, as a result of which the use of materials increases additionally.

After a lateral branch opening has been produced, the previously described connecting pieces are fastened in the pipe, the connecting piece sealing on the surface of the pipe. The weld-on connecting pieces are configured with an internal thread or with a pipe end for welding on or pressing on. Clamps are usually configured with an internal thread.

The present invention is therefore based on the technical problem of providing a press-in connecting piece, a system consisting of a press-in connecting piece and a tool and a setting tool for attaching a press-in connecting piece to connect a branch pipe to a pipe which require a lower installation effort and are thereby more cost effective.

The previously indicated technical problem is solved according to the invention firstly by a press-in connecting piece for connecting a branch pipe to a pipe in the region of a branch opening having the features of claim 1. The press-in connecting piece according to the invention has a pipe adapter with an inner opening and a press-in nozzle having a pipe socket, the pipe adapter having a sealing surface for resting in a sealing manner on the outer wall of the pipe and the pipe socket having a tapering end portion remote from the pipe adapter.

The press-in connecting piece can be inserted into a previously made branch opening in the pipe and, as described in the following, can be pressed in by a simple working procedure. In this respect, the pipe socket of the press-in nozzle is held by the pipe adapter from the outside and it protrudes through the branch opening into the interior of the pipe. During the working procedure, the inner end portion of the pipe socket is beaded and widened so that this part of the pipe socket rests on the pipe wall from inside and exerts a pressing force onto the press-in nozzle and thereby onto the pipe adapter. The pipe adapter then optionally seals with the pipe wall from outside by a seal or by a suitable choice of material. Thereafter, a pipe, a pipe connector or a fitting can be introduced in a sealing manner into an internal thread formed in the press-in nozzle.

The technical problem indicated above is also solved by a system for fastening the press-in connecting piece on a pipe, the tool having a draw mandrel which comprises a shank and a forming portion with a greater external diameter than the shank. In this respect, the external diameter of the entire shank is smaller than the internal diameter of the pipe socket of the press-in nozzle.

The technical problem indicated above is also solved by a setting tool for fastening a previously described press-in connecting piece on a pipe by means of a pressing machine, comprising a draw mandrel which has a shank and a forming portion with a greater external diameter than the shank, a housing and a traction carriage arranged movably in the housing, the housing having slot holes in two mutually opposite side surfaces, wherein the housing has a first end face for resting on the pressing machine and a second opposite end face for resting on the press-in connecting piece, and wherein the traction can be connected to the draw mandrel and has a transverse opening for receiving a fastening bolt of the pressing machine.

Thus, a conventional pressing machine which is usually available for installation work can be used for setting the press-in connecting piece. However, the main purpose of use of the pressing machine is to press pipe connectors and fittings by cold forming the parts to be connected. Only the setting tool, and not any special machine, additionally has to be provided for the use of the press-in connecting pieces.

SUMMARY OF THE INVENTION

In the following, the invention will be described in more detail on the basis of preferred features and of advantages associated therewith.

A shoulder for resting on the tapering end portion of the press-in nozzle is preferably arranged between the shank and the forming portion. This shoulder improves the mode of operation of the tool in that the shoulder ensures a defined position of the shank relative to the press-in nozzle.

The press-in nozzle can be easily installed using this tool in that the press-in connecting piece is initially introduced, together with the tool, into the pipe through a previously made branch opening or through a transverse hole. In this respect, the pipe adapter is adapted to the respective size and curvature of the pipe.

The tool lying on the inside is then pulled outwards by a tensile force, said tensile force being generated by a manual or motor-driven traction machine by being supported on the outer surface of the press-in nozzle or on the pipe adapter formed in one piece with the press-in nozzle. Due to the tensile force, the transition between shank and forming portion formed on the draw mandrel or the shoulder formed in this area rests on the distal end of the pipe socket of the press-in nozzle and stresses the pipe socket radially outwards out of the pipe. The part of the pipe socket located in the pipe is beaded and radially widened thereby.

Due to the beading procedure, the press-in nozzle together with the pipe adapter is drawn against the pipe and results in the desired sealing, optionally by a compression of a seal between pipe and pipe adapter. The radial widening procedure increases the undercut of the press-in nozzle in the pipe and thereby increases the pull-out resistance thereof.

The surface of the forming portion is preferably surface-hardened, provided with a wear-reducing coating and/or with a friction-reducing coating to ensure an extended service life of the tool.

As a result of the previously described press-in connecting piece according to the invention and of the described system with tool according to the invention, firstly a smaller workload is involved compared to welding for producing the lateral branch and less material is used compared to a clamp. Furthermore, the press-in method is carried out without the effect of heat, which is why no safety precautions have to be taken on the construction site, as is necessary for example in welding methods. In addition, due to the suitably selected shape of the pipe adapter, the press-in connecting piece sits orthogonally to the pipe axis and does not require manual alignment and/or measurement.

As already mentioned, a seal for sealing the pipe adapter with respect to the pipe can be provided, preferably a conventional O ring. However, the sealing surface of the pipe adapter can also directly seal with the outer surface of the pipe by a suitable choice of material without the need for a separate seal.

Possible materials for the pipe, the pipe adapter and the press-in connecting piece include metals, plastics as well as combinations, the selected materials having to be adequately dimensionally stable. For the portions of the press-in connecting piece to be formed, it is also required that they are permanently plastically deformable in the region of the tapering end portion in order to permanently retain the shape obtained by forming.

The pipe adapter and the press-in nozzle can preferably be formed in one piece. As a result, only one component with a possible seal is required to install a branch pipe.

On the other hand, in the case of the described press-in connecting piece, the pipe adapter and the press-in nozzle can be formed in two pieces, the press-in nozzle having a flange and the pipe adapter having a contact surface which is adapted to the flange of the press-in nozzle and arranged opposite the sealing surface. The press-in nozzle is then connected to the pipe adapter in a sealing manner, again optionally with a separate seal, so that a tight branch pipe is installed in the compound structure. This connection can be permanently produced by welding, adhesive bonding, soldering or by another method.

In this respect, the pipe socket of the press-in nozzle also preferably has an external diameter which is adapted to the internal diameter of the pipe adapter so that the pipe adapter simultaneously allows a guidance, optionally orthogonally to the axis of the pipe.

Irrespective of whether the insert sleeve and the pipe adapter are formed in one piece or in two pieces, the compound structure of the two components has an inner opening to which the branch pipe can be connected. For this purpose, a pipe piece can be welded or joined integrally in another way to the compound structure and the branch pipe is then connected to the pipe piece in particular by a press connection. Likewise, it is also possible to provide in the inner opening an internal thread, into which the branch pipe or a fitting can be screwed to connect the branch pipe.

Furthermore, the pipe socket of the press-in nozzle can have an external diameter which is adapted to the internal diameter of the branch opening so that a precise seat in the branch opening is ensured and a fixed seat of the press-in connecting piece is ensured after beading and widening.

The tapering end portion of the pipe socket is also preferably configured at least partly conical. As a result, the lower edge of the pipe socket is oriented inwards and downwards so that this edge can firmly engage with the shoulder formed on the draw mandrel or at the transition between the tapering portion and the shank. Furthermore, produced between the—usually cylindrical—portion of the pipe socket and the conical end portion is an inwardly bent encircling line which forms a predetermined bend during beading while the tool is pulled out.

The tapering end portion can also be spherical or otherwise round-bodied, so that the forming procedure is simplified particularly at the beginning.

In a further preferred manner and greatly simplifying the beading procedure, the pipe socket has in the region of the end portion a plurality of openings which facilitate an outwards expansion in a radial direction. The openings preferably extend in the longitudinal direction and can preferably be formed continuously in the region of the cylindrical portion of the pipe socket and/or in the region of the end portion. This configuration of the openings facilitates the widening in the region of the described bend between the conical end portion and the cylindrical portion of the pipe socket.

A further advantage of the openings is that when a downwardly branching branch pipe is connected, and when a fluid medium such as water is transported in the pipe, the openings allow or do not prevent the emptying of the pipe. The openings preferably extend up to the pipe wall and do not obstruct the emptying of the pipe.

The openings can be formed as continuous slot holes or as a plurality of holes, in particular as rows of holes in the end portion and/or in the end portion of the press-in nozzle.

The tool described above for attaching a press-in connecting piece can preferably be configured in that the forming portion of the draw mandrel widens conically or spherically. If a traction machine is used which is supported against the press-in connecting piece and which pulls the draw mandrel outwards, then the conical or spherical portion has the effect that the end portion of the press-in connecting piece is easily beaded and widened. A manual removal is also possible without a traction machine, optionally by means of threads.

In a further embodiment of the tool, the forming portion has a substantially cylindrical shape, and it has a greater diameter than the shank. As a result, the shoulder is then formed which rests against the end portion of the pipe portion of the press-in nozzle while the draw mandrel is pulled out. During removal, the end portion is then beaded and at least partly widened.

The described tool can advantageously have a guide adapter, connectable to the press-in nozzle, having an inner guide surface to guide the draw mandrel. As a result, a guidance of the draw mandrel can be obtained over a longer distance than is possible with the press-in nozzle alone. For this purpose, the guide adapter can be provided with an external thread for screwing into the internal thread of the press-in nozzle.

The tool is preferably further developed by a clamping sleeve which for pushing over the draw mandrel and is thereby developed in that on the end remote from the forming portion, the draw mandrel has an external thread to screw thereon a threaded nut. In this respect, the clamping sleeve preferably fits into the previously described optional guide adapter and is guided thereby. By tightening the threaded nut on the draw mandrel, the clamping sleeve is pretensioned downwards against the widened forming portion of the draw mandrel. As a result, a radially inwardly directed collar of the tapered end portion of the press-in nozzle is clamped and secured.

Furthermore, the clamping sleeve can have an external thread to screw thereon a further threaded nut. The nut then draws the clamping sleeve and the draw mandrel together with the end portion of the press-in nozzle out of the pipe portion of the press-in nozzle, as a result of which the beading and widening procedures are carried out in the described manner.

When the draw mandrel with the clamping sleeve is drawn out of the pipe, the clamped collar is also drawn and the tapering end portion is precisely beaded and widened. As the draw mandrel continues to be pulled out, the collar is finally separated from the end portion of the press-in nozzle by shearing off and is also transported outwards. The severing procedure advantageously increases the cross section of the beaded and widened press-in nozzle. Furthermore, the removal of the separated collar signals a successful assembly to the installer.

The above-mentioned setting tool for fastening a press-in connecting piece on a pipe can preferably use one of the previously mentioned draw mandrels for setting the press-in connecting piece. During operation, the pressing machine, which is provided per se for pressing fittings, advances a ram relative to brackets which are connected to the pressing machine and project in the pressing direction. Detachably connected to the brackets is a fastening bolt which engages with the traction carriage, while the traction carriage is connected to, in particular screwed together with the draw mandrel. In other words, the pressing machine forms a first movement unit with the projecting brackets, the fastening bolts, the traction carriage and the draw mandrel.

Furthermore, the first end face of the housing rests on the ram or on a mount connected to the ram of the pressing machine, while the second end face rests on the press-in connecting piece. The movable ram, the housing of the setting tool and the press-in connecting piece thereby form a second movement unit.

The advance of the ram then leads to a relative movement between the two movement units and thus to a removal of the draw mandrel from the pipe on which the press-in connecting piece is to be fastened. The ram presses the housing and the press-in connecting piece away relative to the draw mandrel, traction carriage and brackets of the pressing machine. However, since the housing rests in a stationary manner on the pipe, this results during operation of the pressing machine in a relative movement of the pressing machine away from the pipe. Consequently, the draw mandrel is pulled out of the pipe which, in turn, leads to the above-described beading and widening of the press-in nozzle of the press-in connecting piece.

A compression spring is also preferably arranged in the housing of the setting tool to pretension the traction carriage in the direction of the second end face. As a result, in the state unloaded by the pressing machine, the draw mandrel is pressed out of the housing, thereby facilitating the installation of the press-in connecting piece with the inserted draw mandrel.

It is also preferable to provide an anti-rotation means between the traction carriage and the housing of the setting tool so that when the draw mandrel is rotated into the traction carriage, the traction carriage rotates inside the housing. If the traction carriage is cylindrical, a pin can be provided as the anti-rotation means which is connected to, in particular screwed into the traction carriage and runs inside a slot hole in the housing. However, if the traction carriage is not rotationally symmetrical, the anti-rotation means can be realised merely by the outer shape of the traction carriage and by the inner shape of the housing.

BRIEF DESCRIPTION OF THE DRAWINGS

Further features and advantages of the present invention are described in the following description of embodiments, concerning which reference is made to the accompanying drawings, in which.

DETAILED DESCRIPTION OF THE INVENTION

Figure 1:
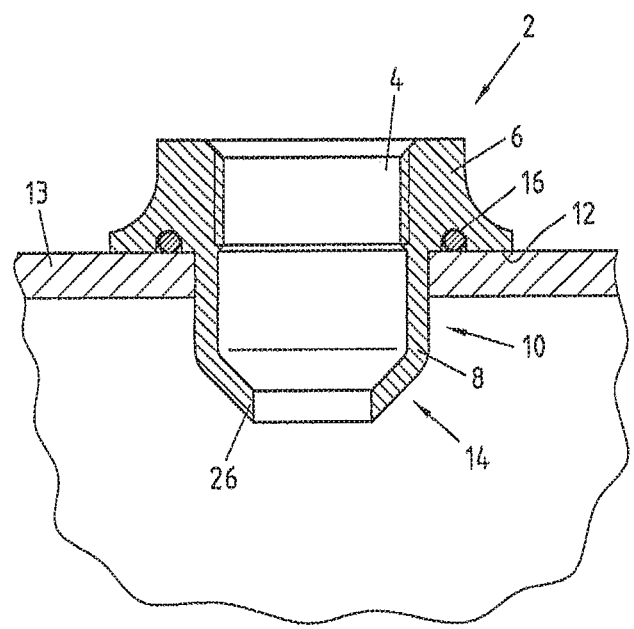
FIG. 1 is a cross-sectional view of a first embodiment of a press-in connecting piece with a single-piece formation of pipe adapter and press-in nozzle.

FIG. 1 shows a first embodiment of a press-in connecting piece 2 according to the invention for connecting a branch pipe to a pipe in the region of a branch opening. The press-in connecting piece 2 comprises a pipe adapter 6 having an inner opening 4 and a press-in nozzle 10 having a pipe socket 8. The pipe adapter 6 also has a sealing surface 12 for resting in a sealing manner on the outer wall of a pipe 13.

Furthermore, the pipe socket 8 has a tapering end portion 14 remote from the pipe adapter 6.

The sealing surface 12 of the pipe adapter 6 is adapted to a particular pipe diameter so that a tight fit is possible on the outside of the pipe 13. For this, for example a separate seal 16 in the form of an O-ring is provided for sealing the pipe adapter 6 from the pipe 13. Instead of a separate seal, a direct seal-less sealing with the outside of the pipe 13 is possible by means of a suitable choice of material.

Figure 2:
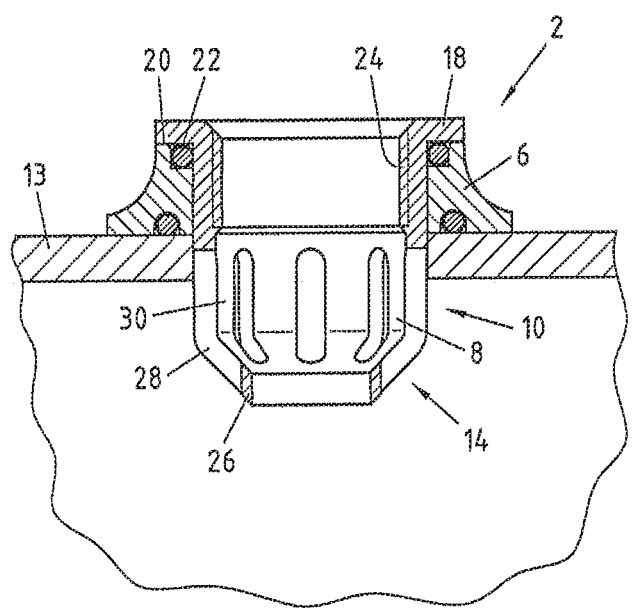
FIG. 2 is a cross-sectional view of a second embodiment of a press-in connecting piece with a two-piece formation of pipe adapter and press-in nozzle.
Figure 3:
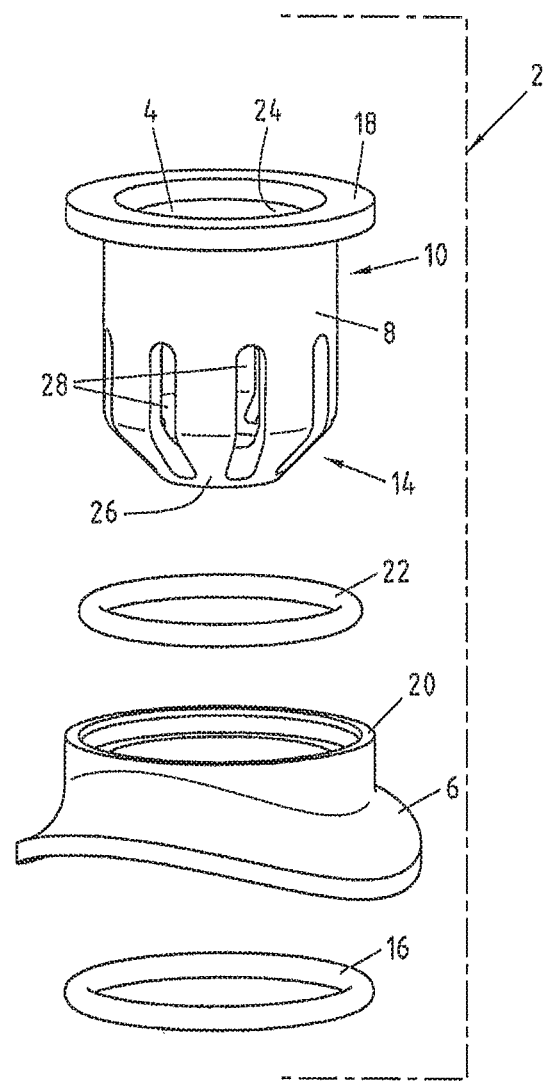
FIG. 3 is a three-dimensional exploded view of the second embodiment of the press-in connecting piece.

As shown in FIG. 1, the pipe adapter 6 and the press-in nozzle 10 are formed in one piece. On the other hand, FIGS. 2 and 3 show a second embodiment of a press-in connecting piece 2 in which the pipe adapter 6 and the press-in nozzle 10 are formed in two pieces. In this case, the press-in nozzle 10 has a flange 18 and the pipe adapter 6 has a contact surface 20 which is adapted to the flange 18 of the press-in nozzle 10 and is arranged opposite the sealing surface 12. A further seal 22 is provided between the flange 18 and the pipe adapter 6. Here as well, a separate seal can be avoided by means of a suitable choice of material.

As can also be seen in FIG. 2, the pipe socket 8 has an external diameter which is adapted to the internal diameter of the pipe adapter 6, so that the pipe socket 8 rests on the inside of the pipe adapter 6.

Consequently, a guidance of the press-in nozzle 10 with respect to the pipe adapter 6 is realised, as a result of which an orthogonal orientation of the press-in nozzle 10 with respect to the pipe axis is achieved and ensured.

Furthermore, the pipe socket 8 has an external diameter which is adapted to the internal diameter of the branch opening of the pipe 13, so that a good fit is achieved here as well. For this purpose, before the press-in connecting piece 2 is installed, a suitable hole is made in the pipe wall.

Finally, an internal thread 24 is introduced into the press-in nozzle 10 so that a pipe connection or a fitting can be suitably connected to the press-in connecting piece 2.

As can be seen in FIGS. 1 to 3, the tapering end portion 14 of the pipe socket 8 is at least partly conical. This produces a cross-sectional narrowing and an inwardly directed lower edge or collar 26 which, during the installation described below, is gripped by the tool and beaded and widened.

As shown in FIGS. 2 and 3, for easier deformability in the region of the end portion 14, a plurality of openings 28 is provided which extend in the longitudinal direction and are configured continuously both in the region of the cylindrical portion 30 of the pipe socket 8 and in the region of the end portion 14. The material of the pipe socket 8 can thereby yield specifically radially outwards in a star shape during the beading and widening procedures.

Figure 4A:
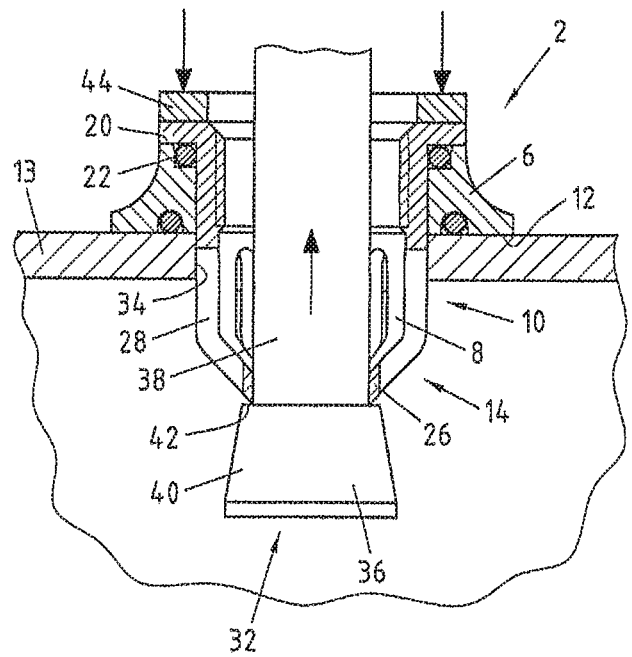
FIG. 4a-d are cross-sectional views of the second embodiment of a press-in connecting piece, installed in a pipe, with attached tool according to a first embodiment with a sequence of individual stages of the beading and widening procedures of the press-in nozzle.

FIG. 4a shows a first embodiment of a system according to the invention with a press-in connecting piece according to FIGS. 2 and 3 and with a tool 32 for fastening a press-in connecting piece 2 according to FIGS. 2 and 3 to a pipe 13 in the region of a branch opening 34. The tool 32 has a draw mandrel 36 which has a shank 38 and a forming portion 40 of a greater external diameter than the shank 38. In this respect, the greatest external diameter of the forming portion 40 is smaller than the internal diameter of the pipe socket 8 of the press-in nozzle 10.

Furthermore, arranged between the shank 38 and the forming portion 40 is a shoulder 42 which, during the installation of the press-in connecting piece, rests on the tapering end portion 14 of the press-in nozzle 10 or rests on the collar 26. Consequently, while the draw mandrel 36 is being pulled out, the forming force can be exerted on the end portion 14. If the shoulder 42 is not provided, the tapering end portion 14 is beaded by the cross-sectional widening of the shank alone.

As also shown in FIG. 4a, the forming portion 40 widens conically outwards. An upwardly directed tensile force (indicated by an upwards arrow) can be exerted on the draw mandrel 32 by a traction machine supported against the press-in nozzle 10 via an abutment 44 (shown with downwards arrows) or manually. Consequently, due to the shoulder 42 resting on the lower end of the end portion 14 of the press-in nozzle 10, a two-step forming of the pipe portion 8 occurs. This procedure is shown in steps in FIGS. 4a to 4d.

Figure 4B:
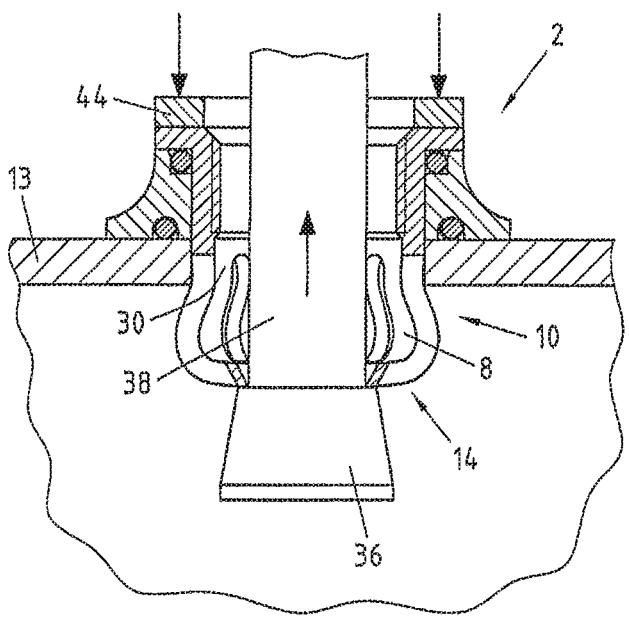

FIG. 4a shows the starting position. FIG. 4b shows the first forming step in which the lower end of the end portion 14 is drawn upwards. Consequently, the material of the end portion 14 is simultaneously displaced outwards, so that the end portion 14 is beaded to an increasing extent. In so doing, the end portion 14 folds over in the region between the conical end portion 14 and the cylindrical portion 30 of the pipe socket 8. After a predetermined displacement path of the shank 38, the edge of the end portion 14 slides off the shoulder 42, so that the beading procedure of the end portion 14 is concluded.

Figure 4C:
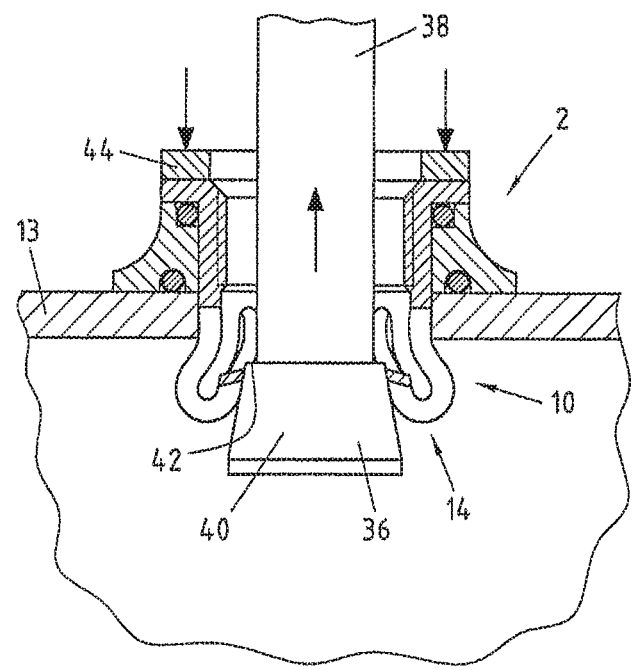
Figure 4D:
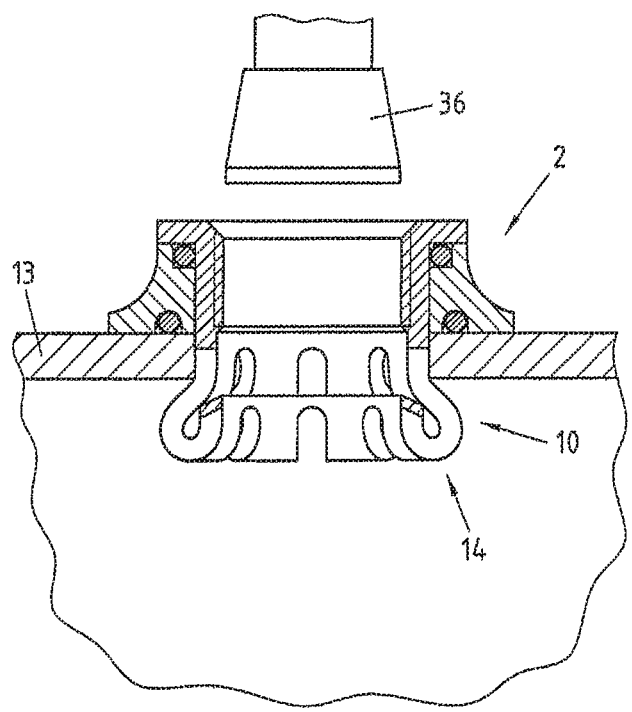

In FIG. 4c, the conically outwardly protruding forming portion 40 of the draw mandrel 36 then comes increasingly into contact with the end portion 14 of the press-in nozzle 10 and, in a second forming step, as it continues to move, it outwardly widens the beaded part of the end portion 14, as shown in FIG. 4d with the extracted shank 38.

Figure 5:
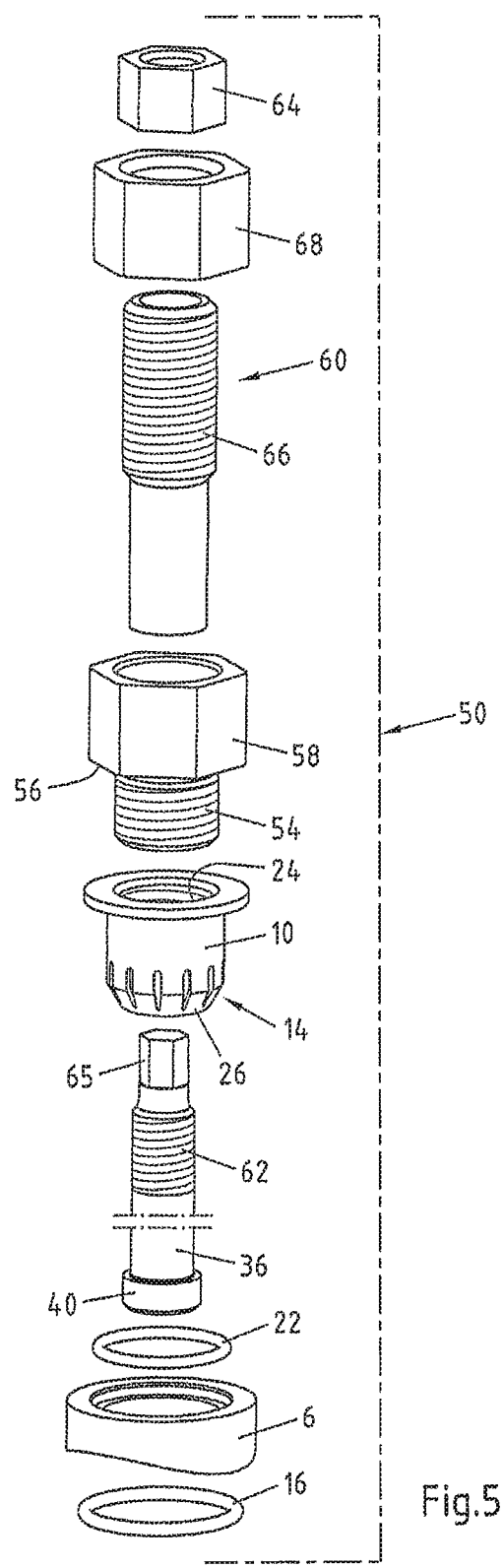
FIG. 5 is a three-dimensional exploded view of a third embodiment of a press-in connecting piece and of a tool for installing the press-in connecting piece.
Figure 6:
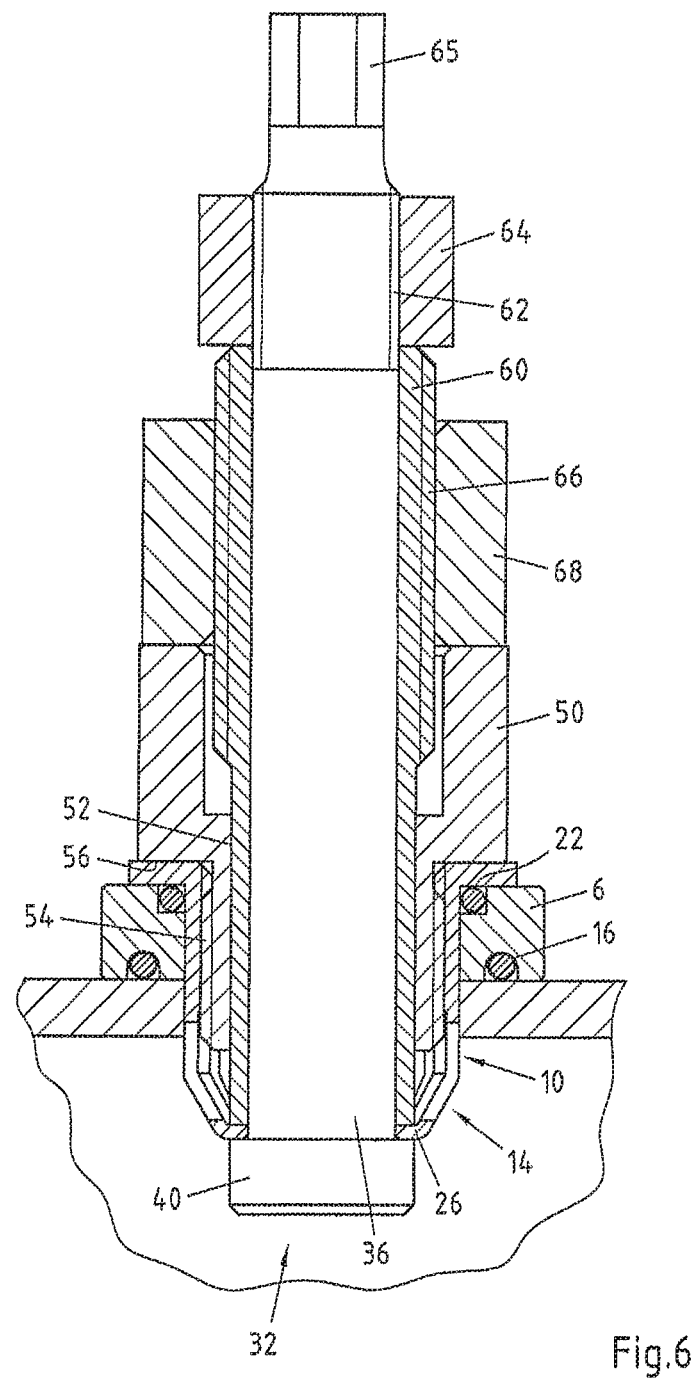
FIG. 6 is a cross-sectional view of the second embodiment of a press-in connecting piece, installed in a pipe, with attached tool according to a second embodiment with a sequence of individual stages of the beading and widening procedures of the press-in nozzle.

FIGS. 5 and 6 show a second embodiment of a tool 32 for installing a press-in connecting piece 2 according to the second embodiment of FIGS. 2 and 3.

In contrast to the first embodiment, the draw mandrel 36 has a forming portion 40 with a substantially cylindrical shape.

Furthermore, a guide adapter 50, connectable to the press-in nozzle 10, having an inner guide surface 52 is provided for guiding the draw mandrel 36. For this purpose, an external thread 54 is provided for screwing into the internal thread 24 of the press-in nozzle 10. Furthermore, a stop surface 56 is provided for resting on the press-in nozzle 10. The guide adapter 50 can be screwed into the internal thread 24 by a hexagon head 58.

Also provided for pushing over the draw mandrel 36 is a clamping sleeve 60 which preferably rests on the inner guide surface 52 of the guide adapter 50. Formed on the draw mandrel 36 above the pushed-on clamping sleeve 60, i.e. on the end remote from the forming portion 40 is an external thread 62 onto which a threaded nut 64 can be screwed. By screwing on the threaded nut 64 while simultaneously countering the rotational movement by means of a hexagonal bolt 65 formed on the upper end of the shank 36, the clamping sleeve is pushed downwards in the direction of the forming portion 40 so that the inwardly directed lower edge or collar 26 of the tapered end portion 14 of the press-in nozzle 10 is clamped and is thereby fixed relative to the draw mandrel 36. The draw mandrel 36 can thus also be referred to as a clamping mandrel.

Furthermore, an external thread 66 is provided on the clamping sleeve 60 to screw thereon a further threaded nut 68. By tightening the threaded nut 68, again while simultaneously countering by means of the hexagonal bolt 65, the clamping sleeve 60 is pulled out of the pipe 13 together with the draw mandrel 36 and with the clamped collar 26 of the end portion 14 of the press-in nozzle 10.

Figure 7A:
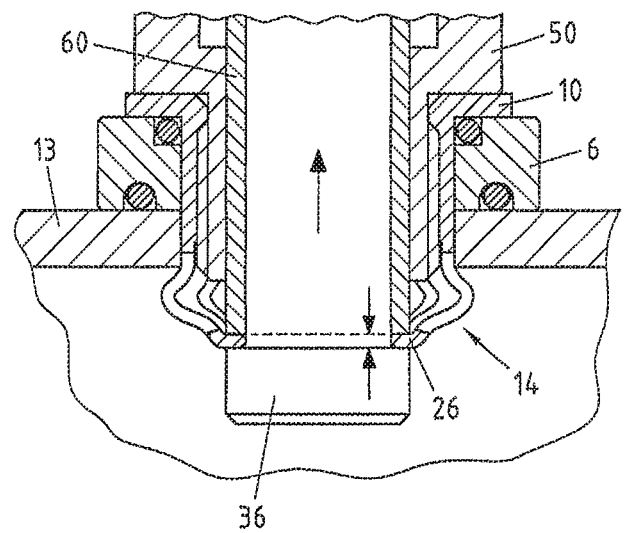
FIG. 7a-c are cross-sectional views of the embodiment according to FIG. 6 with a sequence of individual stages of the beading and widening procedures of the press-in nozzle.
Figure 7B:
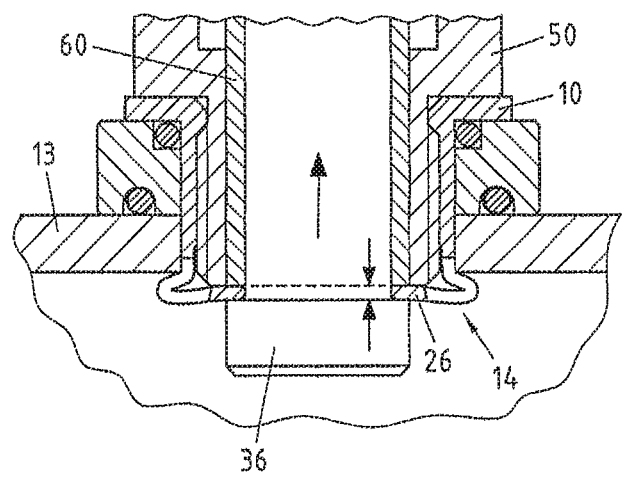
Figure 7C:
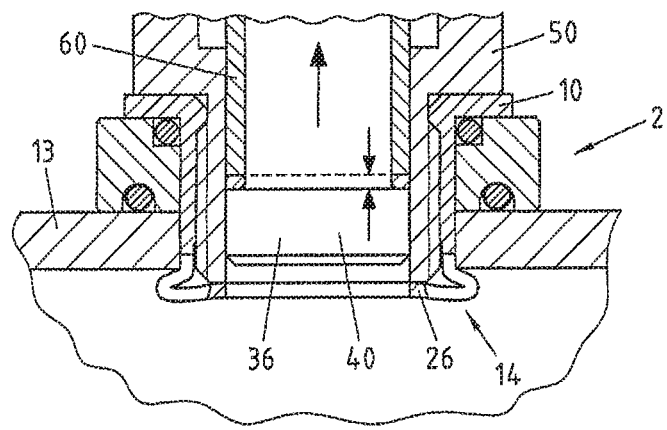

During the movement of the draw mandrel 36 out of the pipe 13 which is shown in FIG. 7a-c, the end portion 14 of the press-in nozzle 10 is thus beaded and widened as described above. Furthermore, at the end of the forming procedure (FIG. 7b), a tensile force is exerted on the clamped collar 26 so that the collar 26 shears off at the lower edge of the guide adapter 50, is separated from the end portion 14 and is pulled out of the press-in nozzle 10 and thus out of the press-in connecting piece 2 (FIG. 7c).

In FIGS. 8 to 12, an embodiment of a setting tool according to the invention is shown on its own and interacting with a draw mandrel, a press-in connecting piece and a pressing machine. In this respect, in the following the same reference numerals are used as before in the description of the previous embodiments.

Figure 8:
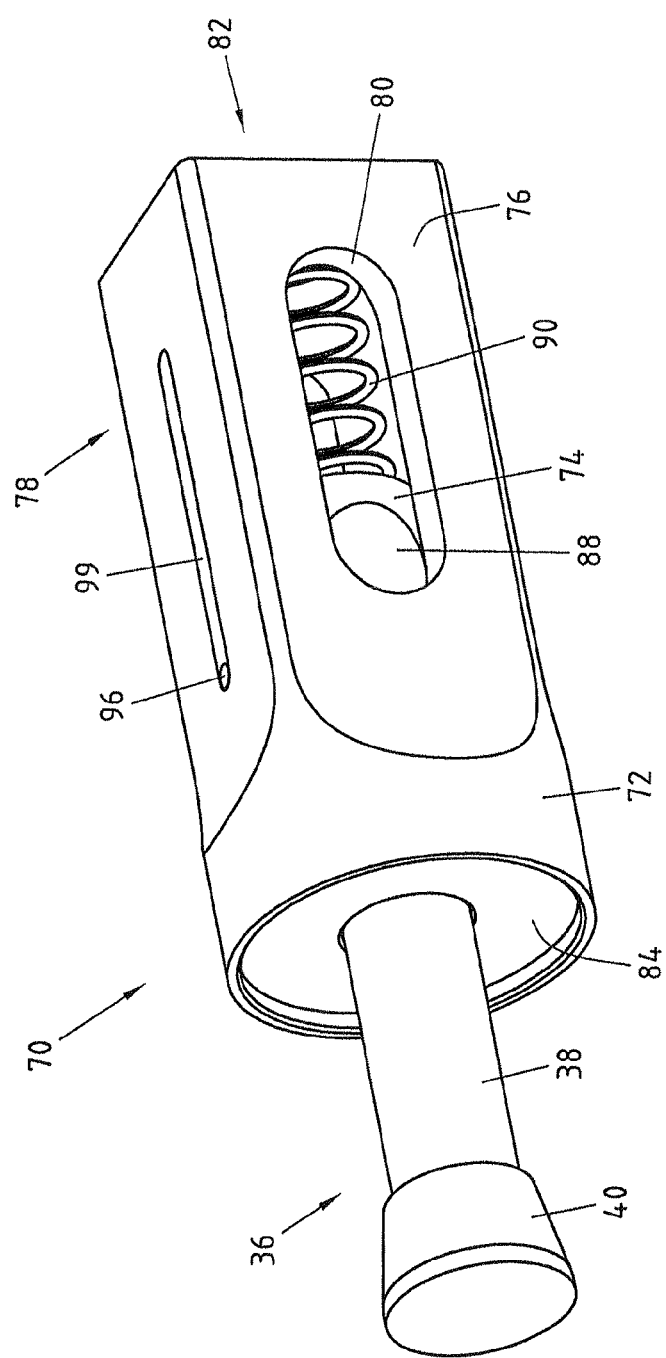
FIG. 8 shows a setting tool according to the invention with attached draw mandrel.
Figure 9:
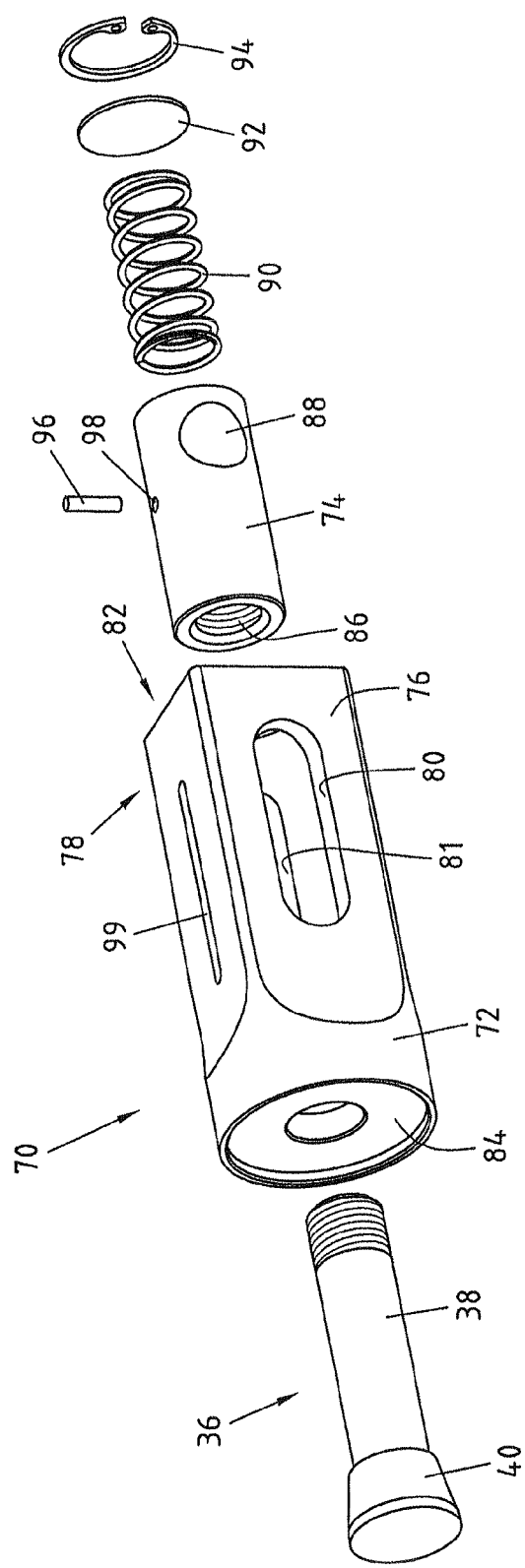
FIG. 9 is a three-dimensional exploded view of the setting tool according to FIG. 8.

FIGS. 8 and 9 show a setting tool 70 for fastening a press-in connecting piece on a pipe, as previously described in connection with FIGS. 1 to 4. As already shown in FIGS. 4a to 4d, a draw mandrel 36 is provided which has a shank 38 and a forming portion 40 having a greater external diameter than the shank 38.

The setting tool 70 also has a housing 72 and a traction carriage 74 arranged moveably in the housing 72. The housing 72 has slot holes 80 and 81 in two opposite side surfaces 76 and 78, the housing 72 having a first end face 82 for resting on the pressing machine and a second opposite end face 84 for resting on the press-in connecting piece. Furthermore, the traction carriage 74 can be connected to the draw mandrel 36 by a thread 86 and it has a transverse opening 88 for receiving a fastening bolt of the pressing machine, as described further below with reference to FIGS. 11 and 12.

As also shown in FIGS. 8 and 9, a compression spring 90 is arranged in the housing 72 for pretensioning the traction carriage 74 in the direction of the second end face 84. To position the compression spring 90, a disc 92 and a locking ring 94 are also provided as an abutment.

Furthermore, the setting tool has an anti-rotation means in the form of a pin 96 which is screwed into a threaded hole 98 and is guided in a slot hole 99 in the housing 72. The purpose of this anti-rotation means is to secure the traction carriage 74 against rotating when the draw mandrel 36 is screwed into the thread 88.

Figure 10:
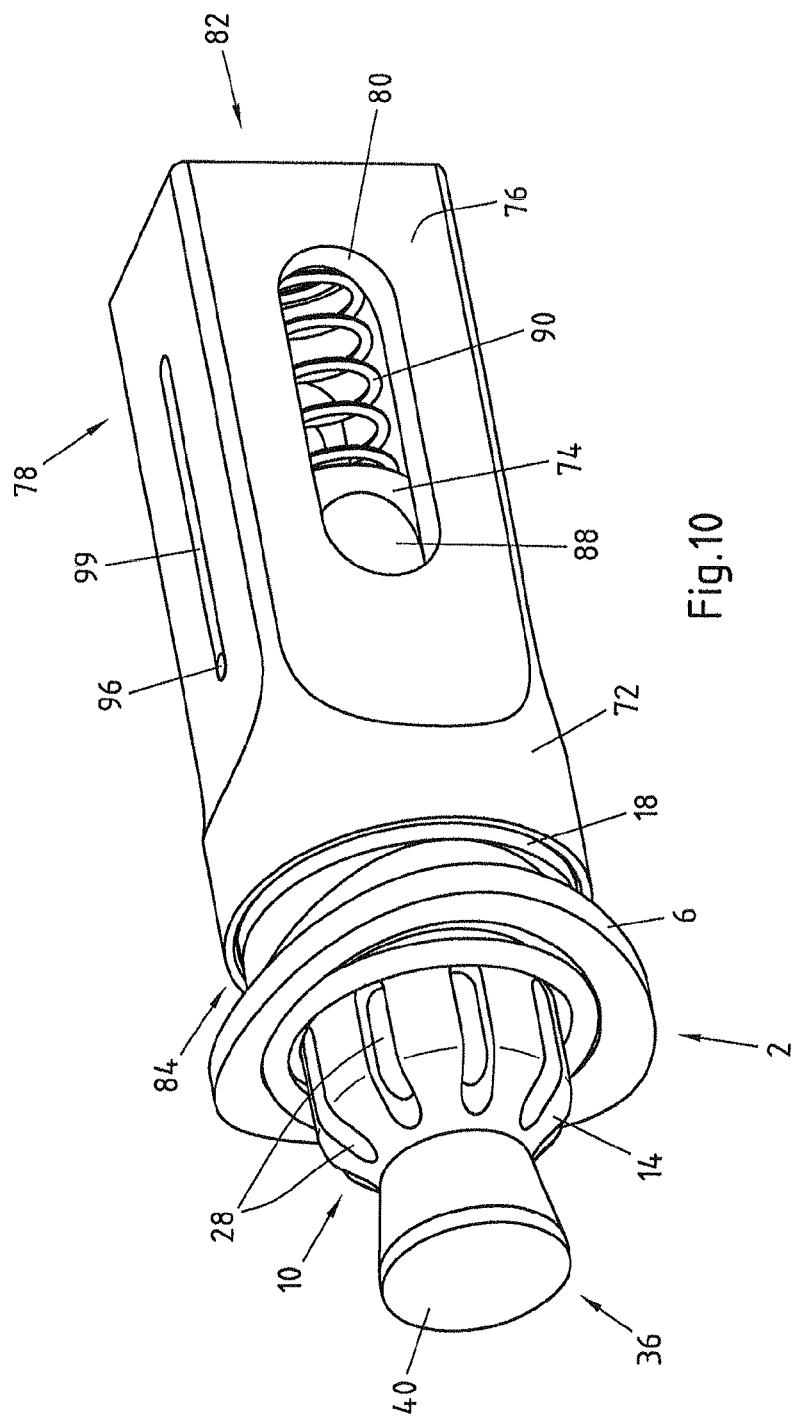
FIG. 10 shows the setting tool according to FIGS. 8 and 9 with attached draw mandrel and press-in connecting piece connected thereto.

FIG. 10 shows the previously described setting tool with attached press-in connecting piece 2 which is pressed onto the side surface 84 by the draw mandrel 36 and is thereby held in position. For this purpose, the draw mandrel 36 is connected to the traction carriage 74.

Figure 11:
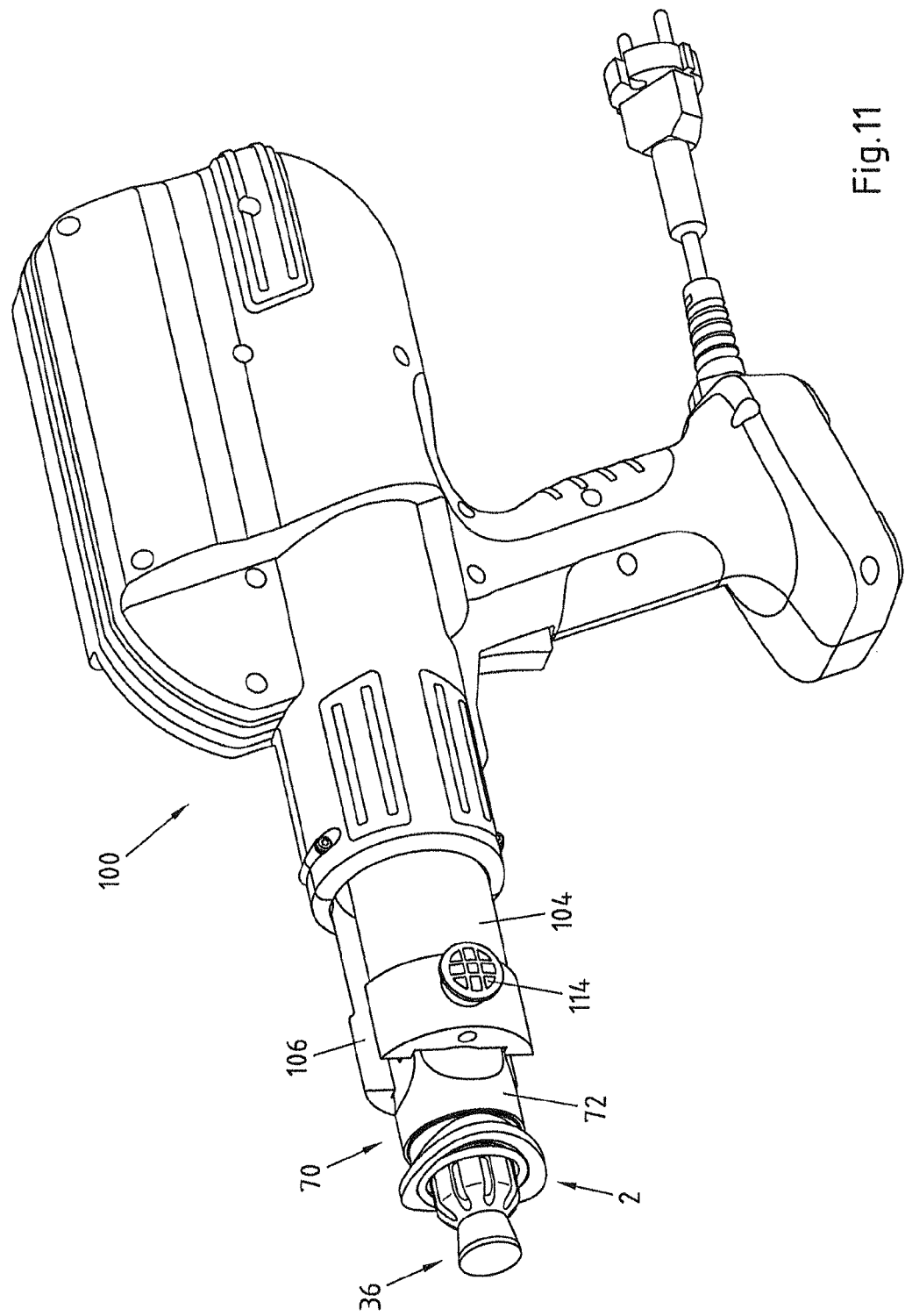
FIG. 11 shows a pressing tool with connected setting tool according to FIG. 10.
Figure 12:
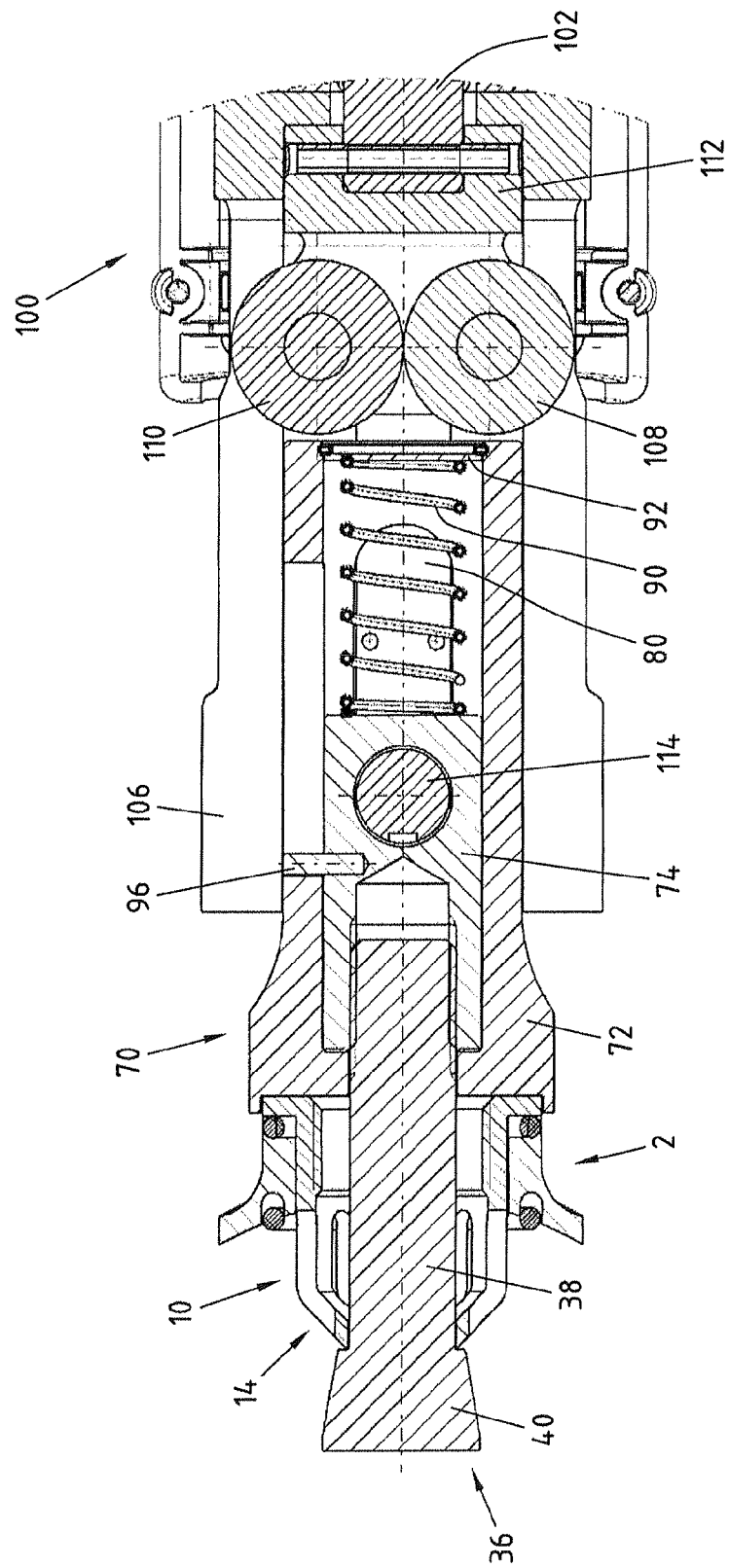
FIG. 12 is a cross-sectional view of a detail from FIG. 11.

In FIGS. 11 and 12, the setting tool 70 is described in cooperation with a conventional pressing machine 100 which is suitable per se for pressing fittings and pipe connectors. The pressing machine 100 is provided to advance a ram 102 relative to brackets 104 and 106 which are connected to the pressing machine 100 and to thereby move a pair of rollers 108 and 110 via a mount 112. The configuration of the pair of rollers is not important here, the operation thereof is only required for the pressing of fittings and will not be described any further here. In any case, the rollers 108 and 110 linearly transfer the force generated by the ram 102 onto the housing 72.

A fastening bolt 114 is also provided which is detachably connected to the brackets 104 and 106. The traction carriage 74 which is arranged inside the housing 70 is connected to the pressing machine 100 by the fastening bolt 108. When the pressing machine 100 is actuated and the ram 102 is moved relative to the pressing machine 100 and thus also relative to the brackets 104 and 106, a corresponding relative movement occurs between the housing 72 and the traction carriage 74. This relative movement then causes a movement of the press-in connecting piece 2 resting on the housing 72 relative to the tension bolt 36 connected to the traction carriage 74.

Thus, by actuating the pressing machine 100, the tension bolt 36 is pulled out through the press-in connecting piece 2 so that the tapering end portion 14 of the press-in nozzle 10 is beaded and widened. At the end of the movement stroke of the ram 102, the widening procedure is complete and the press-in connecting piece 2 is fastened on the pipe 13 (see FIG. 4).

The invention claimed is:

1. A press-in connecting piece for connecting a branch pipe to a pipe in the region of a branch opening,
    comprising a pipe adapter having an inner opening, and a press-in nozzle having a pipe socket,
    wherein the pipe adapter has a sealing surface for resting on and defining a seal with an outer wall of the pipe,
    wherein the pipe socket has a tapered end portion remote from the pipe adapter,
    wherein the pipe socket has a cylindrical portion, and
    wherein the pipe socket is configured such that the tapered end portion is configured to be beaded by folding over inwards toward a central longitudinal axis of the pipe socket in a region between the tapered end potion and the cylindrical portion and subsequently radially widened by means of a tensile force acting on the end portion in a direction of the pipe adapter, and the press-in nozzle and the pipe adapter are drawn against the pipe.

2. The press-in connecting piece according to claim 1, wherein the pipe adapter and the press-in nozzle are formed in one piece.

3. The press-in connecting piece according to claim 1, wherein
    the pipe adapter and the press-in nozzle are configured in two pieces,
    the press-in nozzle has a flange and
    the pipe adapter has a contact surface which is adapted to the flange of the press-in nozzle and is arranged opposite the sealing surface.

4. The press-in connecting piece according to claim 1, wherein the tapered end portion of the pipe socket is at least partly conical.

5. The press-in connecting piece according to claim 1, wherein the pipe socket has a plurality of openings in a region of the tapered end portion.

6. The press-in connecting piece according to claim 5, wherein the plurality of openings extend in a longitudinal direction into both a region of the cylindrical portion of the pipe socket and the region of the tapered end portion.

7. The press-in connecting piece according to claim 5, wherein the plurality of openings extend in a longitudinal direction.

8. A system comprising a press-in connecting piece according to claim 1 and a tool for fastening a press-in connecting piece on a pipe,
    wherein the tool has a draw mandrel which has a shank and a forming portion with a greater external diameter than the shank, and
    wherein the external diameter is smaller than the internal diameter of the pipe socket of the press-in nozzle.

9. The system according to claim 8,
    wherein a shoulder for resting on the tapered end portion of the press-in nozzle is arranged between the shank and the forming portion.

10. The system according to claim 8,
wherein a guide adapter, connectable to the press-in nozzle, having an inner guide surface is provided to guide the draw mandrel.

11. The system according to claim 8,
wherein a clamping sleeve is provided for pushing over the draw mandrel, and
on the end remote from the forming portion, the draw mandrel has an external thread to screw thereon a threaded nut.

12. The system according to claim 11,
wherein the clamping sleeve has an external thread to screw thereon a threaded nut.

* * * * *